United States Patent [19]

Barraud et al.

[11] Patent Number: 5,567,794

[45] Date of Patent: Oct. 22, 1996

[54] POLYMER MATERIAL OF THE POLYURETHANE ACRYLATE TYPE FOR COATING AN OPTICAL FIBER OR FOR AN OPTICAL FIBER TAPE

[75] Inventors: Jean-Yves Barraud, Paris; Sophie Gervat, Les Clayes Sous Bois; Victorin Ratovelomanana, Viry Chatillon; Bernard Boutevin; Jean-Pierre Parisi, both of Montpellier; Aline Cahuzac, Nimes; Robert Jocteur, Lyons, all of France

[73] Assignee: Alcatel Cable, Clichy Cedex, France

[21] Appl. No.: 43,844

[22] Filed: Apr. 7, 1993

[30] Foreign Application Priority Data

Apr. 7, 1992 [FR] France .................. 92 04222

[51] Int. Cl.⁶ .................. C08G 18/10; C08F 8/30
[52] U.S. Cl. .................. 528/70; 528/75; 528/85; 525/123; 525/453; 525/454; 525/455
[58] Field of Search .................. 528/59, 65, 70, 528/75, 85; 525/123, 453, 454, 455

[56] References Cited

U.S. PATENT DOCUMENTS

| 4,508,916 | 4/1985 | Newell et al. | 526/247 |
| 4,992,524 | 2/1991 | Coady et al. | 528/75 |
| 5,024,507 | 6/1991 | Minns et al. | 526/242 |
| 5,302,316 | 4/1994 | Hashimoto et al. | 252/183.11 |

FOREIGN PATENT DOCUMENTS

| 0260842 | 3/1988 | European Pat. Off. . |
| 2453871 | 11/1980 | France . |
| 1325429 | 8/1973 | United Kingdom . |

OTHER PUBLICATIONS

Chemical Abstracts, vol. 112, No. 24, Jun. 11, 1990, Columbus, Ohio, US; abstract No. 218340p, p. 61; & JP-A-01 308 420 (Nippon Kayaku) Dec. 13, 1989.

Chemical Abstracts, vol. 112, No. 24, Jun. 11, 1990, Columbus, Ohio US; abstrct No. 222177h, pp. 330–331; & JP-A-01 242 613 (Nippon Kayaku) Sep. 27, 1989.

Primary Examiner—James J. Seidleck
Assistant Examiner—John M. Cooney, Jr.
Attorney, Agent, or Firm—Sughrue, Mion, Zinn, Macpeak & Seas

[57] ABSTRACT

A polymer material of the fluorine-containing polyurethane acrylate type for coating an optical fiber or for an optical fiber tape, the material being based on at least a diol, a diisocyanate, and an acrylate, and being characterized by the fact that at least one of the above compounds contains fluorine and that at least one of the above compounds contains sulfur.

8 Claims, No Drawings

POLYMER MATERIAL OF THE POLYURETHANE ACRYLATE TYPE FOR COATING AN OPTICAL FIBER OR FOR AN OPTICAL FIBER TAPE

The present invention relates to a polymer material of the polyurethane acrylate type for coating an optical fiber or for an optical fiber tape.

It is known that optical fibers include two polymer coatings constituted by a primary coating that is itself plastified in contact with the glass fiber and that is covered by a secondary coating. This double coating protects the fiber from a mechanical or chemical attack that could give rise to attenuation defects in optical transmission.

Each coating must adhere well to its own support, and its physical properties must be compatible with the conditions that arise during fiber-drawing, in particular the drawing speed. The primary coating must absorb microcurvature and stresses that may occur in the glass. The secondary coating confers its mechanical properties on the fiber. In addition, the application of optical fibers requires good sealing whether the fibers are used for transmission under sea or on land.

At present, primary and secondary coatings are polymers of the polyurethane acrylate type and they are photocured under ultraviolet radiation. Although their mechanical properties satisfy the above-mentioned requirements, they absorb too much moisture.

The same polymers are also used for stiffening a set of fibers and for making up tapes for optical cables. Thus, optical fibers individually identified by a thin colored organic layer are held together side by side by a polyurethane acrylate resin. Tapes made in this way must be capable of sliding over one another sufficiently well to ensure that the cable is maximally compact. It is observed firstly that the quality of sliding is insufficient and secondly that the resin of the tape adheres too well to the thin colored organic layers of fibers when it comes to removing the resin for making individual connections between the fibers of two tapes.

An object of the present invention is to improve resins of the polyurethane acrylate type for application to optical fibers and to optical fiber tapes.

The present invention provides a polymer material of the fluorine-containing polyurethane acrylate type for coating an optical fiber or for an optical fiber tape, the material being based on at least a diol, a diisocyanate, and an acrylate, and being characterized by the fact that at least one of the above compounds contains fluorine and that at least one of the above compounds contains sulfur.

A characteristic of this material is that it is photocurable.

In a variant, at least one of said compounds contains both fluorine and sulfur, for example a fluorine and sulfur containing acrylate or a fluorine and sulfur containing diol.

Preferably, the fluorine is carried by a partially perfluorinated side chain.

In a first embodiment, the fact that said acrylate is a fluorine-containing and sulfur-containing acrylate having the formula:

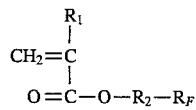

where
—$R_1$ is —H, —$CH_3$, or —F
—$R_2$— is —$(CH_2)_n$—$S(O)_r$—$(CH_2)_m$—
with n and m=2 to 11 and r=0 to 2

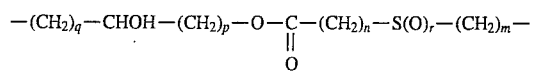

with q and p=1 to 10, r=0 to 2, and n and m=2 to 11

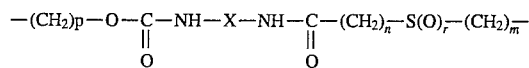

with p=1 to 10, r=0 to 2, and n and m=2 to 11 where:

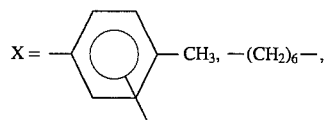

—$R_2$ may also be any other ether or ester group, and —$R_F$ is

—$(CH_2)_n$—$C_mF_{2m+1}$ with n=0 to 9 and m=1 to 10

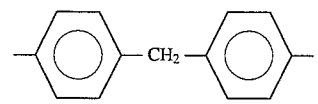

with n=0 to 9 and m=1 to 10.

In a second embodiment, the fact that said acrylate is a fluorine-containing acrylate having the formula:

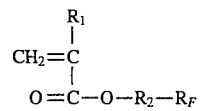

where
—$R_1$ is —H, —$CH_3$, or —F
—$R_2$— is —$(CH_2)_n$— where n=1 to 4
—$(CH_2)_q$—CHOH—$(CH_2)_p$— where q and p=1 to 10

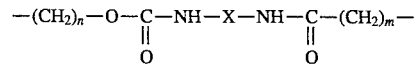

where n and m=1 to 10 where

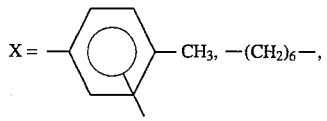

—$R_2$ may also be any other ether or ester group, and —$R_F$ is $-(CH_2)_n-C_mF_{2m+1}$ with n=0 to 9 and m=1 to 10

with n=0 to 9 and m=1 to 10.

For example, the above compounds are selected from:

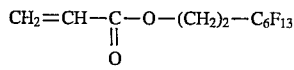

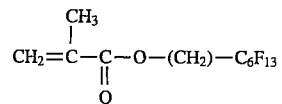

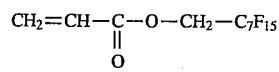

In a third embodiment, said diol is a fluorine-containing and sulfur-containing diol selected from:

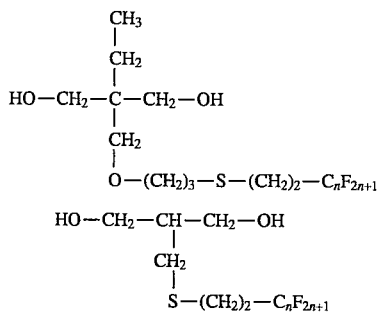

with n=1 to 10 and hydroxyl-terminated polybutadiene (PBHT):

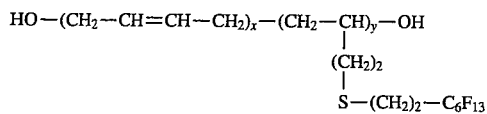

with x=18 and y=4 or else x=40 and y=10.

These fluorine-containing and sulfur-containing diols are obtained by radical or nucleophile addition of a fluorine-containing thiol on an ethylene bond of a diol.

In a fourth embodiment, said diol is a sulfur-containing diol such as:

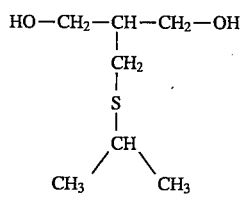

In a fifth embodiment, said diol is a fluorine-containing diol selected from:

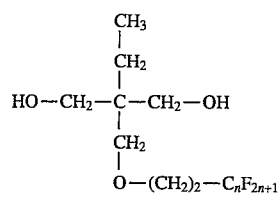

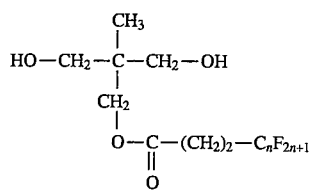

where n=1 to 10.

Fluorine-containing polyurethane acrylates of the invention can be obtained in two steps from these fluorine-containing diols: fluorine-containing diol+diisocyanate—>fluorine-containing diisocyanate prepolymer+ hydroxylated acrylate—>fluorine-containing diacrylate urethane.

In a sixth embodiment, said diisocynate is a fluorine-containing diisocynate of the formula:

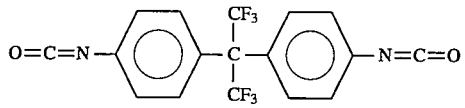

or derived from one of the above-mentioned diols.

A fluorine-containing di- or multiacrylate oligomer is synthesized from these fluorine-containing diisocyanates by reaction with a mono or diacrylate alcohol.

Other characteristics and advantages of the present invention appear from the following description of embodiments given by way of non-limiting example.

EXAMPLE 1

In accordance with the invention, mechanical mixing was performed at 40° C. between a polyurethane acrylate resin designated by the trademark "Desolite 076" and 6% of a fluorine-containing and sulfur-containing acrylate having the formula:

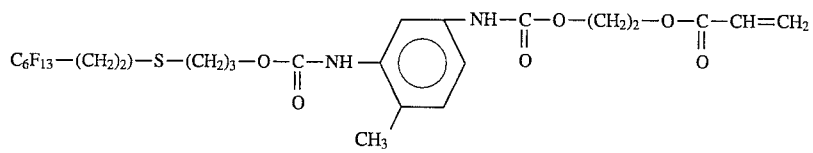

The above fluorine-containing and sulfur-containing acrylate was obtained by reaction between $C_6F_{13}$—$(CH_2)_2$—S—$(C_3H_2)_3$—OH and the product that came from (1/1) reacting toluylene diisocyanate with hydroxyethylacrylate, which product has the formula:

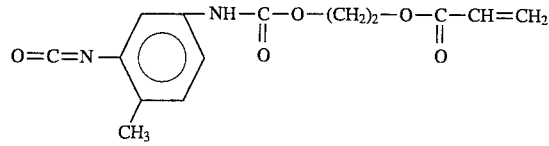

To perform the reaction, 14.5 grams (g) of said product were dissolved in 60 g of anhydrous toluene under nitrogen bubbling in the presence of hydroquinone. The mixture was taken to 60° C. The catalyst, tin dibutyldilaurate was added, and then 21.9 g of alcohol was added drop by drop. The reaction was followed by measuring the —N=C=O functions by infrared spectrometry.

Comparisons were performed between a prior art reference optical fiber having a reference coating comprising a primary layer of "Desolite 076" and a secondary layer of "Desolite 044". It was compared with an optical fiber of the invention having a coating A with a primary layer of material as obtained above and a secondary layer of "Desolite 044".

It was observed that the fiber-drawing conditions for the fiber with coating A were unchanged compared with those of the fiber with the reference coating, and that the mechanical properties of the fiber with coating A were unchanged relative to those of the fiber with the reference coating.

Thereafter, water permeability of the 130 μm thick reference coating was compared with that of the 143 μm thick coating A, using the standard methods of the ASTM D 1653-85 standard ("Standard Test Methods for Water Vapor Permeability of Organic Coating Films").

To do this, the following magnitudes were measured:

Water Vapor Transmission Rate (WVT) in $g/m^2 \times 24$ hours, which represents the quantity of water vapor that is capable of passing through a unit area of the coating in 24 hours;

Water VaporPermeance (WVP) in $g/m^2 \times 24$ hours×millimeters of mercury, where WVP=WVT/ΔP where ΔP is the pressure difference between the two faces of the coatings; and Water Vapor Permeability (P) where P=WVP×l, where l is the thickness of the coating, with P being given in $g \times cm/m^2 \times 24$ hours×mm of mercury.

The values of these three magnitudes show the improvement provided by the material of the invention with respect to water permeability.

In addition, the sliding property of the coatings was characterized by their surface tension γ in millinewtons/meter at 20° C.

| Coating | Thickness μm | WVT $g/m^2 \times 24$ h | WVP = WVP/ΔP | P = WVP × 1 | γ mN/m |
|---|---|---|---|---|---|
| reference A | 130 | 49.9 | 5.7 | $7.4 \times 10^{-2}$ | 34.0 |
|  | 143 | 40.5 | 4.6 | $6.5 \times 10^{-2}$ | 24.7 |

EXAMPLE 2

A fluorine-containing and sulfur-containing diol was prepared as follows.

134 g of trimethylolpropane were dissolved in 800 ml of acetone. Thereafter 1 g of paratoluenesulfonic acid was added to the mixture which was maintained at 25° C. for 24 hours. After evaporation of the acetone, the product was distilled under a vacuum (boiling point $Pb_{0.6mbar}$=90° C. to 93° C.) and acetal was obtained.

30 g of the previously obtained alcohol were dissolved in 1 liter of sodium hydroxide (NaOH) containing 5.82 g of tetrabutylammonium hydrogen sulfate. 65.7 g of allyl chloride was added to the mixture which was maintained at 42° C. for 24 hours. The mixture was diluted in 200 ml of methylene chloride, washed in water, evaporated, and dried. The product was then purified by distillation ($pb_{0.2mbar}$= 61°–63° C.), and an allyl ether was obtained.

32.33 g of 1H,1H,2H,2H-perfluorooctane-1-thiol (PFOT) were dissolved in 100 ml of acetonitrile under an argon atmosphere, and the solution raised to 85° C. Thereafter 0.4 g of azobisisobutylonitrile (AIBN) were added thereto together with 17.34 g of the previously obtained allyl ether. After 24 hours of reaction time, the acetonitrile was evaporated and the product dried under a vacuum.

173.4 g of this product were redissolved in 200 ml of methanol and 10 ml of water. 30 ml of ion-exchanging resin (Amberlite®iR120+) were added to the solution. After 24 hours of reaction time, the resin was eliminated by filtering and the methanol was evaporated. A fluorine-containing and sulfur-containing diol was then obtained.

EXAMPLE 3

The following were added to 100 ml of toluene: 25 g of the fluorine-containing and sulfur-containing diol obtained in Example 4; 18.97 g of 2,2,4-trimethylhexamethylenediisocyanate; and 0.66 g of 1,4-diazabicyclo [2.2.2]octane (DABCO); and the mixture was allowed to react at 80° C. for 2 hours. Thereafter, 10.48 g of 2-hydroxyethylacrylate were added and the reaction was allowed to continue under the same conditions until the —N=C=O band at 2240 $cm^{-1}$ was observed to disappear under infrared analysis. The toluene was then evaporated and 54 g of fluorine containing and sulfur-containing urethane acrylate oligomer were obtained.

The urethane acrylate oligomer was then mixed with 20% by weight of a reactive diluant constituted by hexamethylene-1,6-diacrylate and 3% by weight of a photoinitiator called "Irgacure 651".

An optical fiber of the invention having a coating B whose secondary layer is the material obtained above was compared with a prior art reference optical fiber having a reference coating with a secondary layer of "Desolite 044".

The methods described in Example 1 were then used for comparing the water permeability of the 59 μm thick secondary layer of the reference coating and the 48 μm thick secondary layer of coating B.

| Coating | Thickness μm | WVT g/m² × 24 h | WVP = WVP/ΔP | P = WVP × 1 |
|---|---|---|---|---|
| reference | 59 | 70.2 | 8 | $4.7 \times 10^{-2}$ |
| B | 48 | 32.6 | 3.7 | $1.8 \times 10^{-2}$ |

EXAMPLE 4

A fluorine-containing and sulfur-containing diol was prepared as follows.

125 g of PBHT of mass 1220 were dissolved in 200 ml of tetrahydrofuran at 70° C. Thereafter 7.6 g of AIBN and 160 g of PFOT were added. After 15 hours of reaction time at 70° C., the solvent was evaporated and the resulting fluorine-containing and sulfur-containing diol was dried under a vacuum.

It had the following formula:

$$HO-(CH_2-CH=CH-CH_2)_{18}-(CH_2-CH)_4-OH$$
$$|$$
$$(CH_2)_2$$
$$|$$
$$S-(CH_2)_2-C_6F_{13}$$

The following were caused to react for a period of 2 hours at 80° C. in 150 ml of toluene: 69.2 g of the fluorine-containing and sulfur-containing diol as obtained above; 11.5 g of 2,2,4-trimethylhexamethylenediisocyanate; and 0.9 g of DABCO. Thereafter 6.15 g of 2-hydroxyethylacrylate were added and the reaction was allowed to continue at 60° C. until infrared analysis enabled the disappearance of the —N=C=O band to be observed. The toluene was then evaporated and 86 g of fluorine-containing and sulfur-containing urethane acrylate oligomer were thus obtained.

The previously obtained oligomer was mixed with the reactive diluant and the photoinitiator in the manner described in Example 3.

An optical fiber of the invention having a coating C with a secondary layer of the above-obtained material was compared with a prior art reference fiber having a reference coating with a secondary layer of "Desolite 044".

The water permeability of the 59 μm thick secondary layer of the reference coating was compared with that of the 58 μm thick coating C using the methods described in Example 1.

| Coating | Thickness μm | WVT g/m² × 24 h | WVP = WVP/ΔP | P = WVP × L |
|---|---|---|---|---|
| reference | 59 | 70.2 | 8 | $4.7 \times 10^{-2}$ |
| C | 58 | 26.3 | 3.0 | $1.7 \times 10^{-2}$ |

Naturally the invention is not limited to the embodiments described above. Without going beyond the ambit of the invention, it would be possible to replace any means by equivalent means.

We claim:

1. A polymer material of fluorine-containing polyurethane acrylate for coating an optical fiber or for an optical fiber tape, said polymer material being based on at least a diol, a diisocyanate, and an acrylate, wherein at least one of the diol, diisocyanate and acrylate contains sulfur and at least one of the diol, diisocyanate and acrylate contains fluorine and wherein said acrylate is a fluorine-containing and sulfur-containing acrylate having the formula:

$$\begin{array}{c} R^1 \\ | \\ CH_2=C \\ | \\ O=C-O-R_2-R_F \end{array}$$

where

—$R_1$ is —H, —$CH_3$, or —F

—$R_2$— is —$(CH_2)_n$—$S(O)_r$—$(CH_2)_m$ with n and m=2 to 11 and r=0 to 2, $$+CH_2\!\!\!+_q\!CHOH+CH_2\!\!\!+_p\!O-\underset{\underset{O}{\|}}{C}+CH_2\!\!\!+_n\!S(O)_r\!+CH_2)_m$$

with q and p=1 to 10, r=0 to 2, and n and m=2 to 11, $$+CH_2)[p\!+_p\!O-\underset{\underset{O}{\|}}{C}-NH-X-NH-\underset{\underset{O}{\|}}{C}+CH_2\!\!\!+_n\!S(O)_r\!+CH_2\!\!\!+_m\!-$$

with p=1 to 10, r=0 to 2, and n and m=2 to 11 where $$X = -\!\!\bigcirc\!\!\!\begin{array}{c}CH_3, +CH_2\!\!\!+_6, \end{array}$$

$$-\!\!\bigcirc\!\!-CH_2-\!\!\bigcirc\!\!-, \text{ or}$$

—$R_2$ is any other ether or ester group, and —$R_F$ is —$(CH_2)_n$—$C_mF_{2m+1}$ with n=0 to 9 and m=1 to 10

$$+CH_2\!\!\!+_n\!\!\bigcirc\!\!-C_mF_{2m+1}$$

with n=0 to 9 and m=1 to 10.

2. A polymer material of fluorine-containing polyurethane acrylate for coating an optical fiber or for an optical fiber tape, said polymer material being based on at least a diol, a diisocyanate, and an acrylate, wherein at least one of the diol, diisocyanate and acrylate contains sulfur and at least one of the diol, diisocyanate and acrylate contains fluorine and wherein said acrylate is a fluorine-containing acrylate having the formula:

$$\begin{array}{c} R_1 \\ | \\ CH_2=C \\ | \\ O=C-O-R_2-R_F \end{array}$$

where

—$R_1$ is —H, —$CH_3$, or —F

—$R_2$— is —$(CH_2)_n$— where n=1 to 4, $-(CH_2)_q-CHON-(CH_2)_p-$ where q and p=1 to 10.

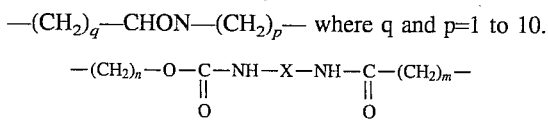

where n and m=1 to 10,
where

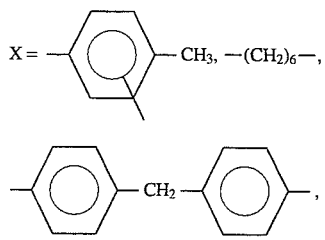

or

—$R_2$ is any other ether or ester group, and —$R_F$ is
—$(CH_2)_n-C_mF_{2m+1}$ with n=0 to 9 and m=1 to 10

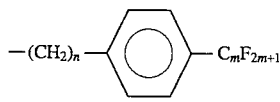

with n=0 to 9 and m=1 to 10.

3. A polymer material according to claim 2, wherein said fluorine-containing acrylate is selected from:

$$CH_2=CH-\underset{O}{\underset{\|}{C}}-O-(CH_2)_2-C_6F_{13},$$

$$CH_2=\underset{CH_3}{\overset{CH_3}{C}}-\underset{O}{\underset{\|}{C}}-O-(CH_2)-C_6F_{13} \text{ and}$$

$$CH_2=CH-\underset{O}{\underset{\|}{C}}-O-CH_2-C_7F_{15}$$

4. A polymer material of fluorine-containing polyurethane acrylate for coating an optical fiber or for an optical fiber tape, said polymer material being based on at least a diol, a diisocyanate, and an acrylate, wherein at least one of the diol, diisocyanate and acrylate contains sulfur and at least one of the diol, diisocyanate and acrylate contains fluorine and wherein said diol is a fluorine-containing and sulfur-containing diol selected from:

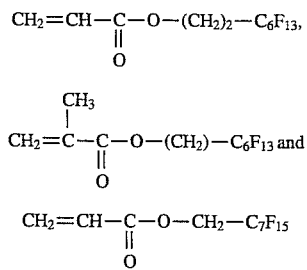

with n = 1 to 10 and

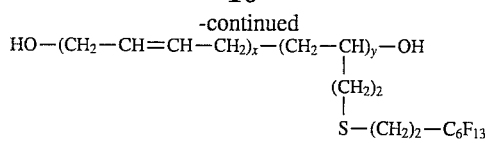

with x=18 and y=4 or else x=40 and y=10.

5. A polymer material of fluorine-containing polyurethane acrylate for coating an optical fiber or for an optical fiber tape, said polymer material being based on at least a diol, a diisocyanate, and an acrylate, wherein at least one of the diol, diisocyanate and acrylate contains sulfur and at least one of the diol, diisocyanate and acrylate contains fluorine and wherein said diol is a sulfur-containing diol represented by:

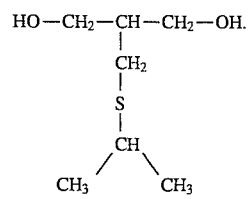

6. A polymer material of fluorine-containing polyurethane acrylate for coating an optical fiber or for an optical fiber tape, said polymer material being based on at least a diol, a diisocyanate, and an acrylate, wherein at least one of the diol, diisocyanate and acrylate contains sulfur and at least one of the diol, diisocyanate and acrylate contains fluorine and wherein said diol is a fluorine-containing diol selected from:

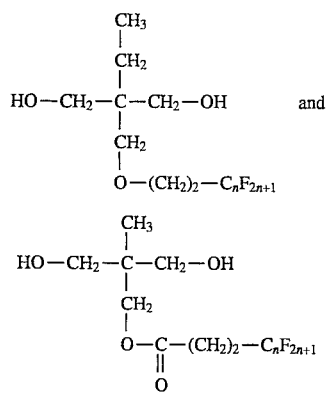

where n=1 to 10.

7. A polymer material of fluorine-containing polyurethane acrylate for coating an optical fiber or for an optical fiber tape, said polymer material being based on at least a diol, a diisocyanate, and an acrylate, wherein at least one of the diol, diisocyanate and acrylate contains sulfur and at least one of the diol, diisocyanate and acrylate contains fluorine and wherein said diisocyanate is a fluorine-containing diisocynate of the formula:

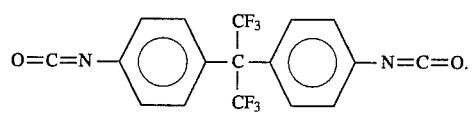

8. A polymer material of fluorine-containing polyurethane acrylate for coating an optical fiber or for an optical fiber tape, said polymer material being based on at least a diol, a diisocyanate, and an acrylate, wherein at least one of the diol, diisocyanate and acrylate contains sulfur and at least one of the diol, diisocyanate and acrylate contains fluoride and wherein said diisocynate is a fluorine-containing diisocynate derived from a diol selected from:
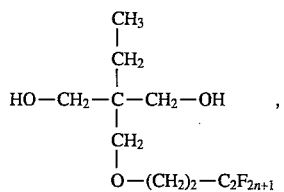
,
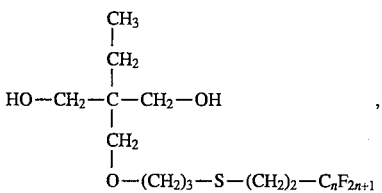
,
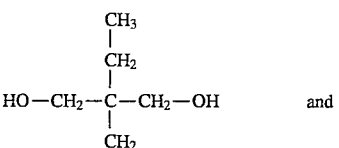
and
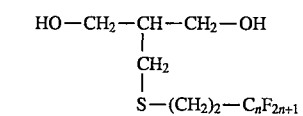
where n=1 to 10.
* * * * *